(12) United States Patent
Lee

(10) Patent No.: US 6,520,644 B1
(45) Date of Patent: Feb. 18, 2003

(54) CYLINDRICAL COLOR WHEEL AND FABRICATING METHOD THEREOF AND PROJECTOR USING THE SAME

(75) Inventor: Seung Gyu Lee, Kyounggi-do (KR)

(73) Assignee: LG Electronics Inc., Seoul (KR)

( * ) Notice: Subject to any disclaimer, the term of this patent is extended or adjusted under 35 U.S.C. 154(b) by 48 days.

(21) Appl. No.: 09/684,924

(22) Filed: Oct. 10, 2000

(30) Foreign Application Priority Data

Oct. 8, 1999 (KR) ............................................ 99-43555
Dec. 17, 1999 (KR) ............................................ 99-58702

(51) Int. Cl.⁷ ............................................... G03B 21/14
(52) U.S. Cl. ......................... 353/31; 348/743; 359/892
(58) Field of Search ............................ 353/84, 31, 33, 353/34, 37, 121; 348/742, 743, 771; 359/891, 892, 889

(56) References Cited

U.S. PATENT DOCUMENTS

| | | | |
|---|---|---|---|
| 5,184,253 A | | 2/1993 | Hwang ........................ 359/889 |
| 5,371,543 A | * | 12/1994 | Anderson .................... 348/743 |
| 5,410,370 A | | 4/1995 | Janssen ....................... 348/756 |
| 5,868,482 A | * | 2/1999 | Edlinger et al. .............. 353/84 |
| 6,256,425 B1 | * | 7/2001 | Kunzman .................... 348/743 |
| 6,266,105 B1 | * | 7/2001 | Gleckman ................... 348/742 |

FOREIGN PATENT DOCUMENTS

| | | |
|---|---|---|
| JP | 11-030712 | 2/1999 |
| KR | 1998-079143 | 11/1998 |
| KR | 2001-36522 | 7/2001 |

* cited by examiner

*Primary Examiner*—William Dowling
(74) *Attorney, Agent, or Firm*—Fleshner & Kim, LLP

(57) ABSTRACT

A cylindrical color wheel that is adaptive for making a slim-type picture projector. In the cylindrical color wheel, a color drum is provided with a plurality of color filters for transmitting only a light beam having a wavelength corresponding to a different color being integrally formed in a cylinder shape. A coupler is attached to the color drum. A motor rotates the coupler to which the color drum is attached.

38 Claims, 20 Drawing Sheets

CYLINDRICAL COLOR WHEEL AND FABRICATING METHOD THEREOF AND PROJECTOR USING THE SAME

BACKGROUND OF THE INVENTION

1. Field of the Invention

This invention relates to a picture projector, and more particularly to a cylinder-type color wheel adaptive for providing a picture projector with a thin thickness and a fabrication method thereof. Also, the present invention is directed to a picture projector using the same.

2. Description of the Related Art

Generally, a picture projector is a device that enlarges and projects a minute picture implemented internally to display it on a large-dimension screen. In order to realize a color, the interior of such a picture projector is provided with a color wheel for separating red (R), green (G) and blue (B) colors on a time basis. The color wheel is rotated by a rotation of a motor to separate a color sequentially.

FIG. 1A and FIG. 1B show a conventional color wheel. Referring to FIGS. 1A and 1B, the conventional color wheel 10 includes a color filter 6 for transmitting only a light beam with a wavelength corresponding to each color in a white light beam, a coupler 4 to which the color filter 6 is attached, and a motor 2 to which the coupler 4 is attached. The color filter 6 consists of a red color filter 6R for transmitting only a light beam corresponding to a red color in a white light beam, a green color filter 6G for transmitting only a light beam corresponding to a green color in a white light beam, and a blue color filter 6B for transmitting only a light beam corresponding to a blue color in a white light beam. The color filter 6 is attached to the coupler 4 by an adhesive, and the coupler 4 is attached to the motor 2 by way of holes 5 provided at the inner side thereof. In other words, the color filter 6 is rotated by a driving force of the motor 2 to sequentially separate a color.

FIG. 2 shows a conventional picture projector in which the color wheel is installed at the interior thereof. Referring to FIG. 2, the conventional picture projector includes a lamp 12 for generating a light beam, a reflector 14 for reflecting a light beam into the front direction of the lamp 12, a first illuminating lens 16 for narrowing a width of a light beam reflected from the reflector 14, a color wheel 10 for transmitting only a specific color light of a light beam, a field diaphragm 22 for shutting off a spurious light beam in a light beam passing through the color wheel 10, second and third illuminating lenses 18 and 20 for narrowing a width of a divergent light beam passing through the field diaphragm 22, a full-reflective mirror 26 for reflecting a light beam passing through the second and third illuminating lenses 18 and 20 in a specific direction, a fourth illuminating lens 28 for converging a light beam reflected from the full-reflective mirror 26 to apply it to a reflective picture display device 30, a reflective picture display device 30 for reflecting a light beam from the fourth illuminating lens 28 in accordance with an image signal to realize a picture beam, and a projecting lens 32 for enlarging and projecting the picture beam realized at the reflective picture display device 30 at a certain distance. A light beam generated from the lamp 12 is focused to the color filter 6 of the color wheel 10 by means of the reflector 14. The first illuminating lens 16 narrows a width of the light beam so that all the light beam focused to the color filter 6 by the reflector 14 can pass through the color filter 6. The color filter 6 is rotated by a driving force of the motor to sequentially transmit red (R), green (G) and blue (B) color lights. A light beam departing a desired light width in light beams passing through the color filter 6 is eliminated by the field diaphragm 22. The light beam passing through the field diaphragm 22 diverges beyond a focus length of the first illuminating lens 16. The second and third illuminating lenses 18 and 20 narrow a width of the light beam so that all the light beam diverging beyond a focus length of the first illuminating lens 16 can be incident to the full-reflective mirror 26. The full-reflective mirror 26 reflects a light beam incident to itself to apply it the fourth illuminating lens 28. The fourth illuminating lens 28 converges a light beam from the full-reflective mirror 26 into the reflective picture display device 30. The reflective picture display device 30 reflects a light beam inputted from the fourth illuminating lens 28 in accordance with an image signal to generate a picture beam carried with a picture information and transfers the picture beam to the projecting lens 32. The projecting lens 32 enlarges the picture beam to transmit the enlarged picture beam onto a screen installed ahead certain distance.

However, the conventional picture projector having the configuration as mentioned above has a problem in that, since only the first illuminating lens 16 is used to input a light beam to the field diaphragm 22, a light beam is converged into the center thereof to have a non-uniform light distribution caused by an increase in a light amount, thereby deteriorating a brightness uniformity of a picture. In order to solve this problem, a picture projector as shown in FIG. 3 has been used.

Referring to FIG. 3, the conventional picture projector includes a lamp 40 for generating a light beam, a reflector 42 for reflecting a light beam into the front direction of the lamp 40, a color wheel 10 for transmitting only a specific color light of the light beam, a road lens 44 for making a uniform light distribution of a light beam passing through the color wheel 10, a collimator lens 46 for progressing a light beam passing through the road lens 44 in parallel, a beam splitter 48 for transmitting a light beam inputted from the collimator lens 46 and reflecting a light beam inputted from a picture display device 50, a picture display device 50 for reflecting a light beam from the collimator lens 46 in accordance with an image signal to display a picture, and a projecting lens 52 for enlarging and projecting a picture beam inputted from the picture display device 50 at a certain distance. A light beam generated from the lamp 40 is focused to the color filter 6 of the color wheel 10 by means of the reflector 42. The color filter 6 is rotated by a driving force of a motor 2 to sequentially transmit red (R), green (G) and blue (B) color lights. The light beam color-separated by the color wheel 10 is incident to the road lens 44. The road lens 44 uniforms a light beam so that the light beam may be uniformly distributed on a screen. A light beam passing through the road lens 44 is progressed to the picture display device 50 in parallel by means of the collimator lens 46. At this time, the light beam progressing from the collimator lens 46 into the picture display device 50 transmits the beam splitter 48. The picture display device 50 reflects a light beam inputted from the collimator lens 46 in accordance with an image signal to generate a picture beam carried with a picture information and transfers the picture beam to the beam splitter 48. The beam splitter 48 32 reflects the picture beam from the picture display device 50 into the projecting lens 52. The projecting lens 52 enlarges the picture beam to transmit the enlarged picture beam onto a screen provided ahead certain distance.

In the conventional picture projector as shown in FIG. 2 or FIG. 3, it is desirable that, when a light beam passes through the color wheel 10, the light beam should pass through a boundary portions of the color filter at a minimum time. In other words, a light beam is shut off when it passes through the boundary portions of the color filter 6. For instance, assuming that the motor is rotated at a speed of 3600 RPM so as to display a field of 60 times per second, a time when a light beam passes through the boundaries will be calculated. In this case, it is assumed that, as shown in FIG. 4, a light beam is a square having a size of 8 mm in width and 6 mm in length, and an inner radius of the color wheel 10 is 30 mm and an outer radius thereof is 40 mm. An angle when the light beam passes through a certain surface of the color filter 6 is given by the following equation.

$$\theta = 2 \times \arctan\left(\frac{3}{31}\right) = 11.055° \quad (1)$$

wherein 31 are a distance from the center of the color wheel 10 until the light beam, and 3 is a half value of the length of the light beam. A time when the light beam passes the boundary portions 7 of the color filter 6 is given by the following equation.

$$t = \frac{1}{60} \times \frac{11.055}{120} = 1.54 \mu s \quad (2)$$

wherein 120 is a value of dividing 360° by 3 (i.e., the number of boundary portions 7). As seen from the equation (2), a time of 1.54 μs is required when the light beam passes through the boundary portions 7 of the color filter 6.

As seen from the above equations (1) and (2), it is necessary to enlarge an inner radius of the color so as to shorten a time when the light beam passes through the boundaries 7 of the color filter 6. However, the conventional picture projector has a problem in that, as an inner radius of the color wheel 10 goes larger, both a size and a weight of the is more increased. Also, the conventional color wheel 10 can not be installed to overlap with an optical system (i.e., various lenses). In other words, the conventional color wheel 10 should be installed such that it can not be interfered with an optical system. For this reason, a large space is required to install the color wheel 10. In order to solve such a problem, there has been suggested a funnel-shaped color wheel 54 as shown in FIG. 5.

Referring to FIG. 5, the funnel-shaped color wheel 54 includes a body 56, a color filter 62 attached to the body 56 to transmit only a light beam with a wavelength corresponding to each color in a white light beam, and a motor 58 to which the body 56 is attached. The color filter 62 consists of a red color filter 62R, a green color filter 62G and a blue color filter 62B for transmitting only any one of red, green and blue light beams, respectively. The color filter 62 is attached to the funnel-shaped body 56, and the body 56 is attached to the motor 58. The color filter 62 is rotated by a driving force of the motor 58 to sequentially separate a color.

FIG. 6 shows a picture projector in which a funnel-shaped color wheel is installed at the interior thereof. Referring to FIG. 6, the conventional picture projector provided with a funnel-shaped color wheel includes a lamp 64 for generating a light beam, a reflector 66 for reflecting a light beam into the front direction of the lamp 64, a color wheel 54 for transmitting only a specific color light of the light beam, a road lens 68 for making a uniform light distribution of a light beam passing through the color wheel 54, an objective lens 70 for focusing a light beam passing through the road lens 68, a collimator lens 72 for progressing a light beam diverging beyond a focus length of the objective lens 70 in parallel, a beam splitter 74 for transmitting a light beam inputted from the collimator lens 72 and reflecting a light beam inputted from a picture display device 76, a picture display device 76 for reflecting a light beam from the collimator lens 72 in accordance with an image signal to display a picture, and a projecting lens 78 for enlarging and projecting a picture beam inputted from the picture display device 76 at a certain distance. In a picture projector provided with the funnel-shaped color wheel 54, the color wheel 54 and the road lens 68 overlap with each other by a desired portion to improve a space utility. However, since such a funnel-shaped color wheel 54 has boundary portions 63 shaped in an oblique line, it is not easy to utilize the boundary portion.

FIGS. 7A to 7C shows a method of fabricating the conventional color wheel. Referring to FIG. 7A, first, a sheet 80 is coated with a red dye so as to product a red color filter 6R. At this time, if it is intended to product a green color filter 6G, the sheet 80 is coated with a green dye; and if it is intended to product a blue color filter 6B, the sheet 80 is coated with a blue dye. After the sheet 80 was coated, the sheet 80 is cut away in compliance with a size of the color filter 6R as shown in FIG. 7B. The color filter 6R cut from the sheet 80 is attached to the coupler 4 by an adhesive as shown in FIG. 7C, and the coupler 4 is attached to the motor 2 by way of the holes 5 provided at the interior thereof. The color filter 6 is rotated by a driving force of the motor 2 to sequentially separate a color. In such a method of fabricating the conventional color wheel 10, the color filter 6 is attached to the coupler 4 by an adhesive. However, since an adhesive force of the adhesive has a limit, the color filter 6 may be separated due to a centrifugal force generated upon rotation of the motor 2. Also, the color filter 6 has been from the sheet 8. Accordingly, the color filters 6R, 6G and 6B have a minute difference in shape. If the color filters 6R, 6G and 6B attached to the coupler 4 have a non-uniform shape, then a trembling of the coupler 4 and/or a noise is generated upon rotation of the motor.

SUMMARY OF THE INVENTION

Accordingly, it is an object of the present invention to provide a cylindrical color wheel that is adaptive for making a slim-type picture projector, a fabricating method thereof, and a picture projector employing the same.

In order to achieve these and other objects of the invention, a cylindrical color wheel according to one aspect of the present invention includes a color drum in which a plurality of color filters for transmitting only a light beam having a wavelength corresponding to a different color is integrally formed in a cylinder shape; a coupler to which the color drum is attached; and a motor for rotating the coupler to which the color drum is attached.

A picture projector employing a cylindrical color wheel according to another aspect of the present invention includes a light source for generating a light beam; a first optical device for focusing a light beam inputted from the light source; a second optical device for making a uniform light distribution of the light beam focused at the first optical device; said cylindrical color wheel being integrally formed, in a cylinder shape, with a plurality of color filters to sequentially separate a color light from the light beam inputted from the second optical device; a picture display device for taking advantage of the color light to display a picture according to an image signal; and a projecting lens for enlarging and projecting the picture.

A picture projector employing a cylindrical color wheel according to still another aspect of the present invention includes a light source for generating a light beam; a reflector for reflecting the light beam into the front direction of the lamp; said cylindrical color wheel for sequentially separating and transmitting a color light from the light beam reflected from the reflector; a road lens for making a uniform light distribution of the color light; a collimator lens for progressing the light beam inputted from the road lens in parallel; a picture display device for taking advantage of the color light inputted from the collimator lens to generate a picture beam according to an image signal; a beam splitter, being provided between the collimator lens and the picture display device, for transmitting the color light inputted from the collimator lens and reflecting the picture beam inputted from the picture display device; and a projecting lens for enlarging and projecting the picture beam.

A method of fabricating a cylindrical color wheel according to still another aspect of the present invention includes the steps of coating red, green and blue dyes on the surface of a transparent cylinder-shaped tube; cutting away the transparent cylinder-shaped tube coated with the dyes; attaching the cut-away cylinder-shaped tube to a coupler; and attaching the coupler to a motor.

A method of fabricating a cylindrical color wheel according to still another aspect of the present invention includes the steps of coating red, green and blue dyes on a transparent thin film; cutting away the thin film coated with the dyes; winding the cut-away thin film in a drum shape; attaching the drum-shaped thin film to a coupler; and attaching the coupler to a motor.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1A:
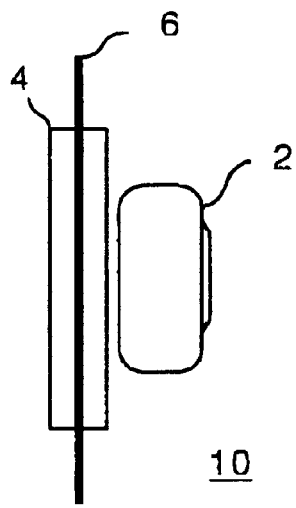
FIG. 1A and FIG. 1B are schematic views showing a structure of a conventional color wheel.
Figure 1B:
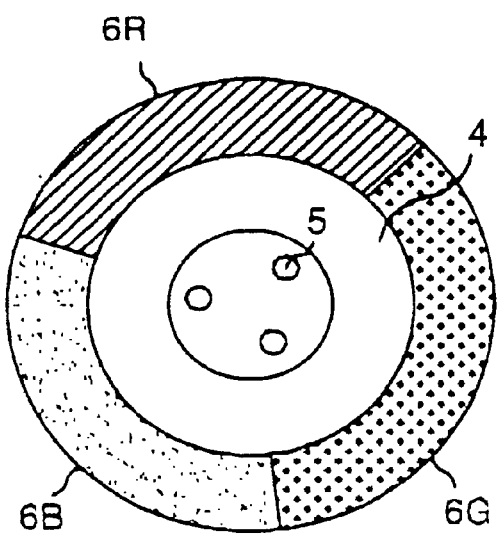
Figure 2:
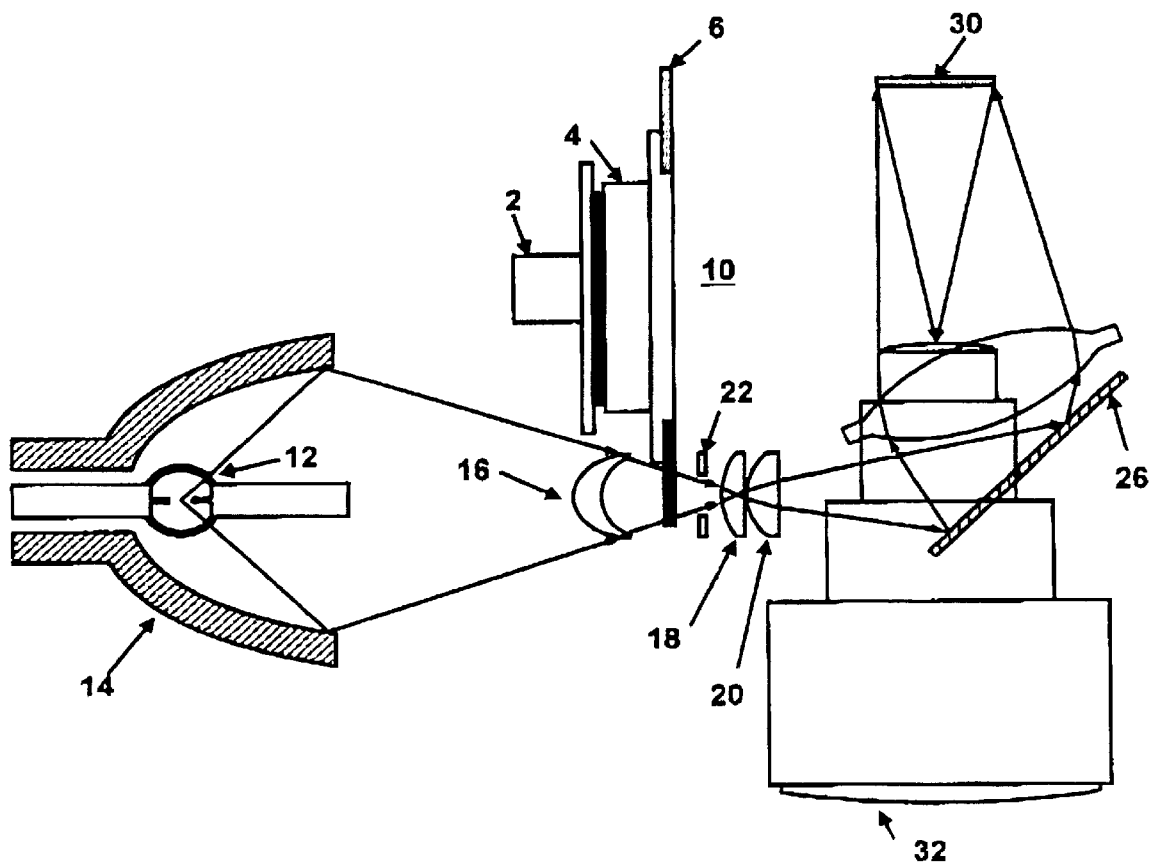
FIG. 2 is a schematic view showing a configuration example of a conventional picture projector in which the color wheel of FIG. 1A is installed at the interior thereof.
Figure 3:
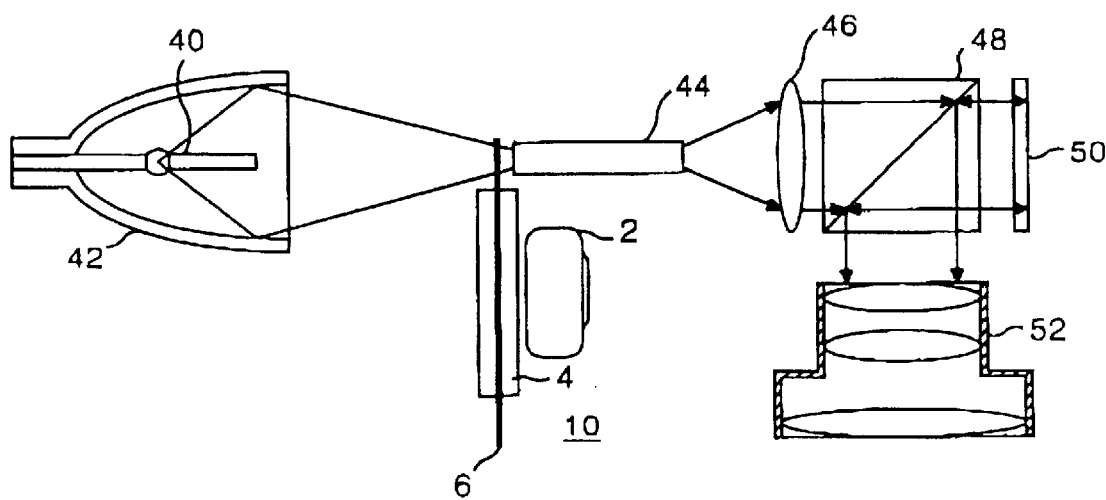
FIG. 3 is a schematic view showing another configuration example of a conventional picture projector in which the color wheel of FIG. 1A is installed at the interior thereof.
Figure 4:
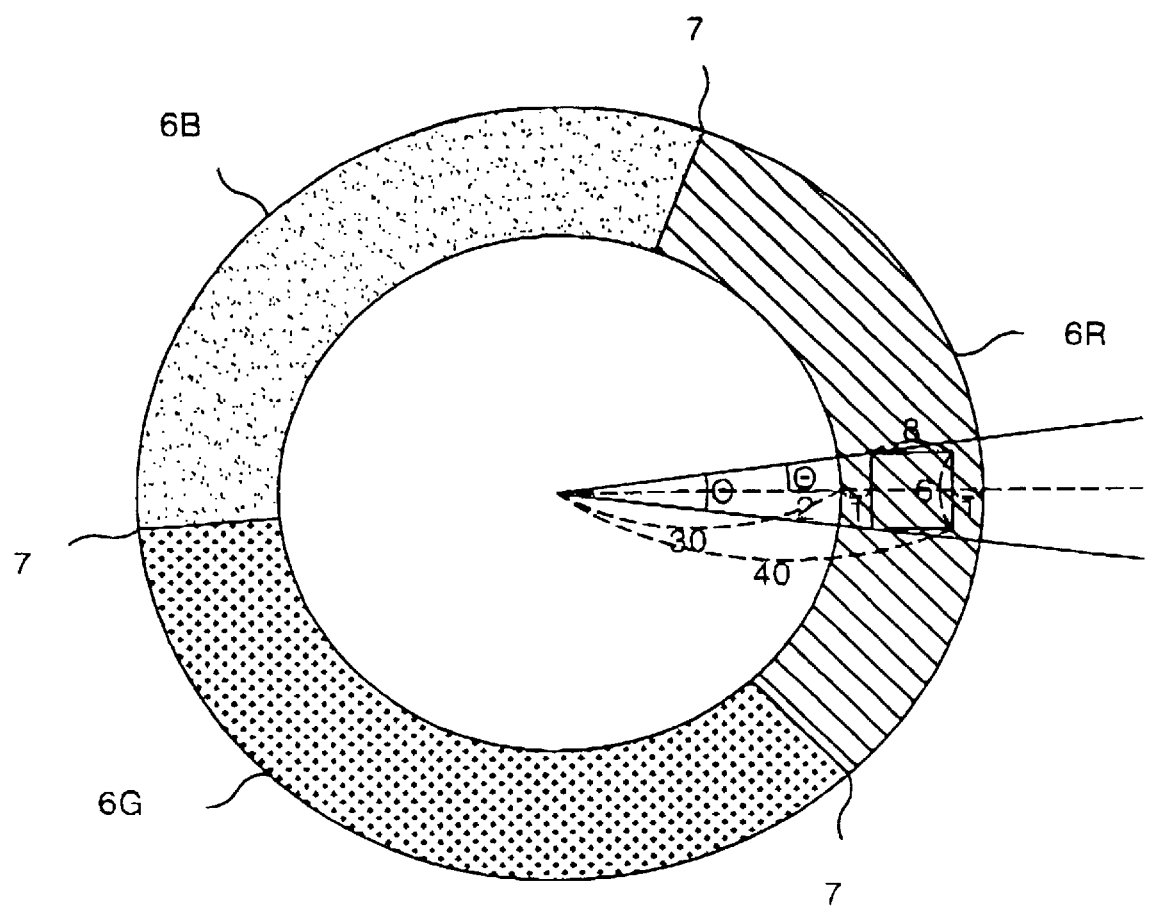
FIG. 4 shows a time when a light beam passes through boundary portions of the color wheel in FIG. 1A.
Figure 5:
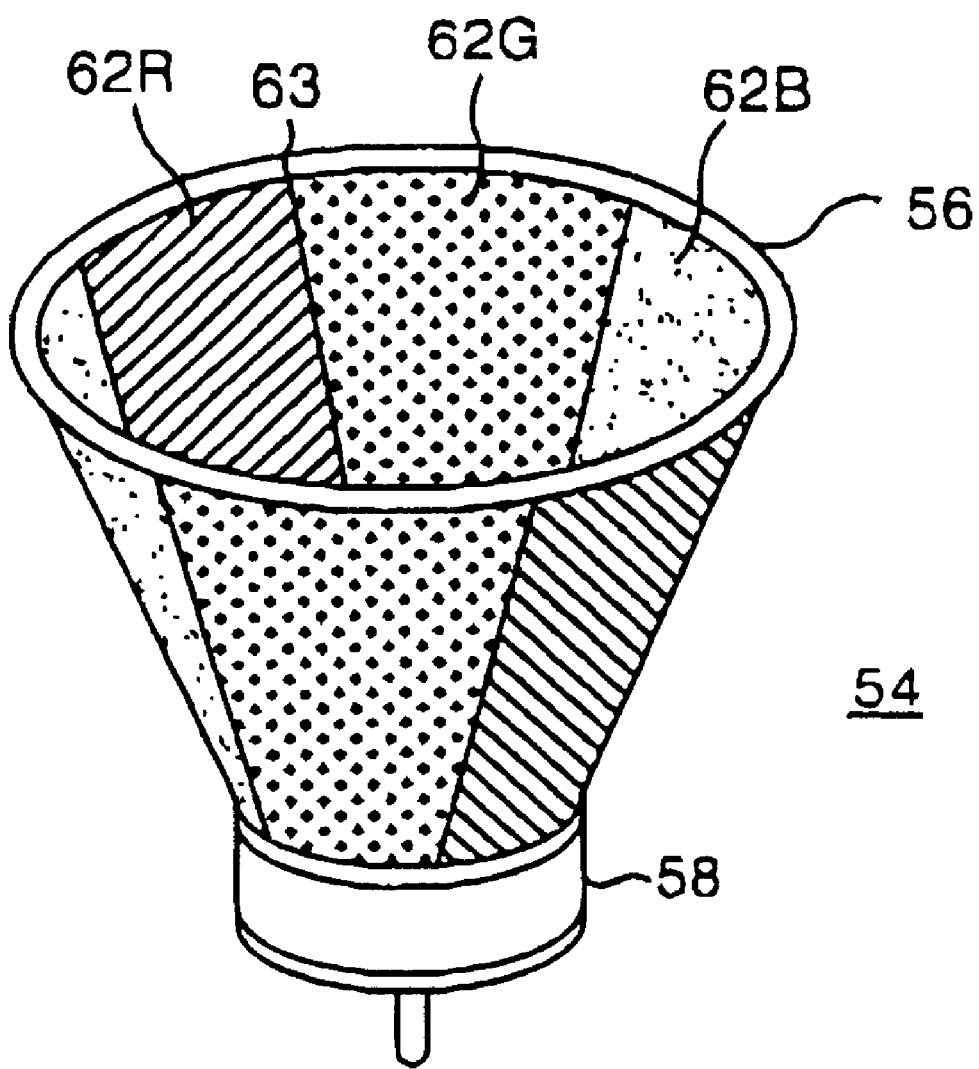
FIG. 5 is a schematic perspective view showing a structure of a conventional funnel-shaped color wheel.
Figure 6:
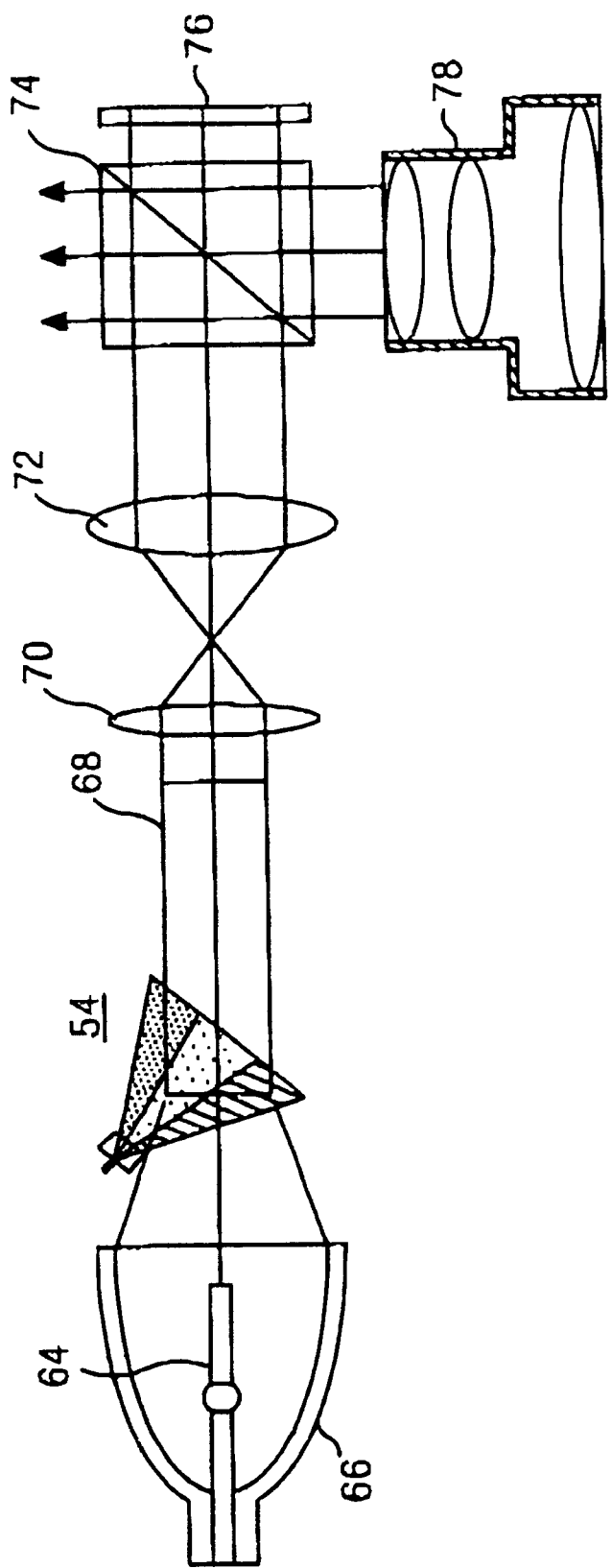
FIG. 6 is a schematic view showing a configuration of a conventional picture projector in which the color wheel of FIG. 5 is installed at the interior thereof.
Figure 7A:
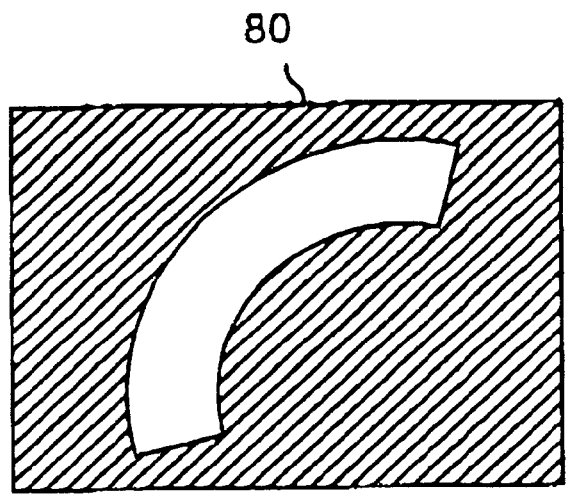
FIG. 7A to FIG. 7C shows a method of fabricating the color wheel in FIG. 1A.
Figure 7B:
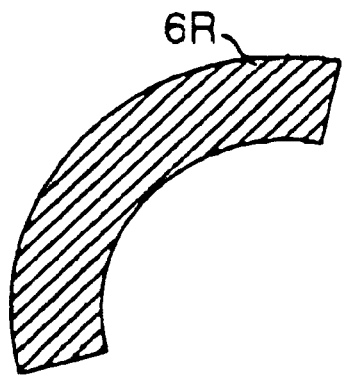
Figure 7C:
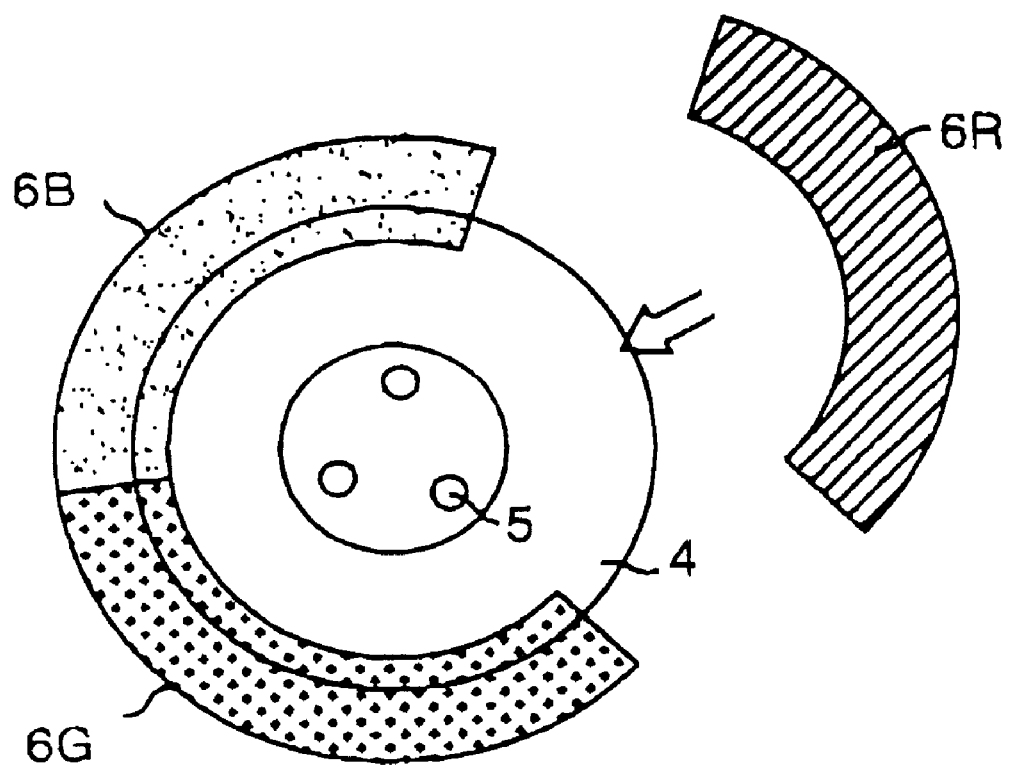
Figure 8A:
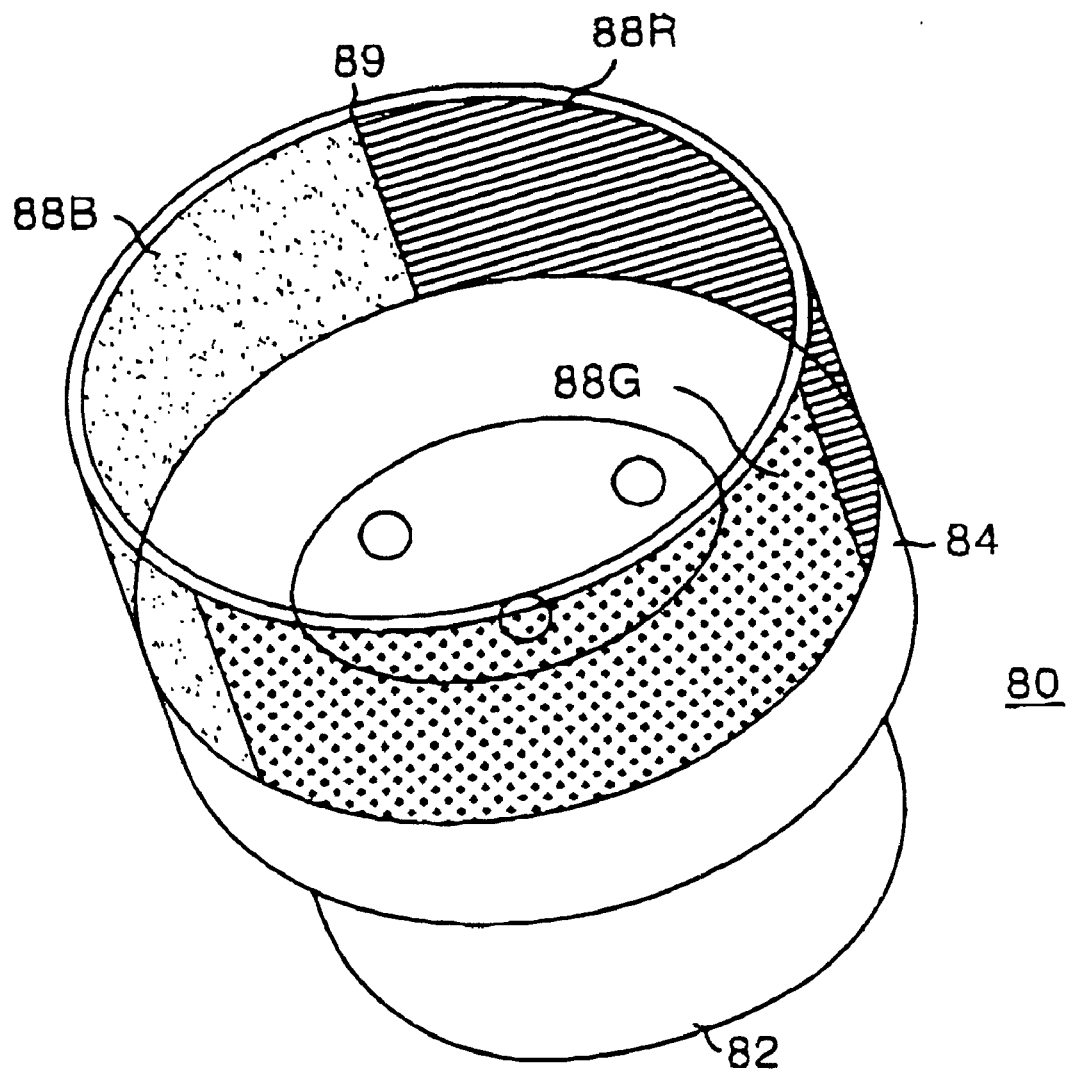
FIG. 8A to FIG. 8C are schematic views showing a structure of a cylindrical color wheel according to an embodiment of the present invention.
Figure 8B:
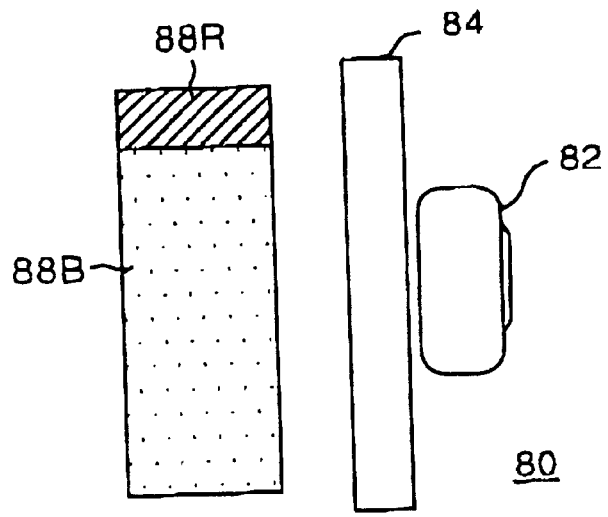
Figure 8C:
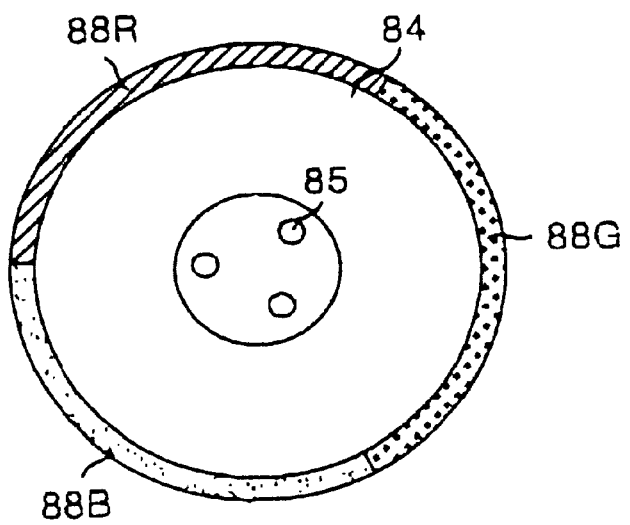

Referring to FIG. 8A to FIG. 8C, there is shown a cylindrical color wheel according to an embodiment of the present invention. The cylindrical color wheel 80 includes a color filter 88 for transmitting only a light beam with a wavelength corresponding to each color in a white light beam, a coupler 84 to which the color filter 88 is attached, and a motor 82 to which the coupler 84 is attached. The color filter 88 consists of a red color filter 88R for transmitting only a light beam corresponding to a red color in a white light beam, a green color filter 88G for transmitting only a light beam corresponding to a green color in a white light beam, and a blue color filter 88B for transmitting only a light beam corresponding to a blue color in a white light beam. The color filter 88 is inserted into the coupler 88 and attached to the coupler 84 by an adhesive. The coupler 84 is attached to the motor 82 by way of holes 85 provided at the inner side thereof. The color filter 88 is rotated by a driving force of the motor 82 to sequentially separate a color.

Figure 9:
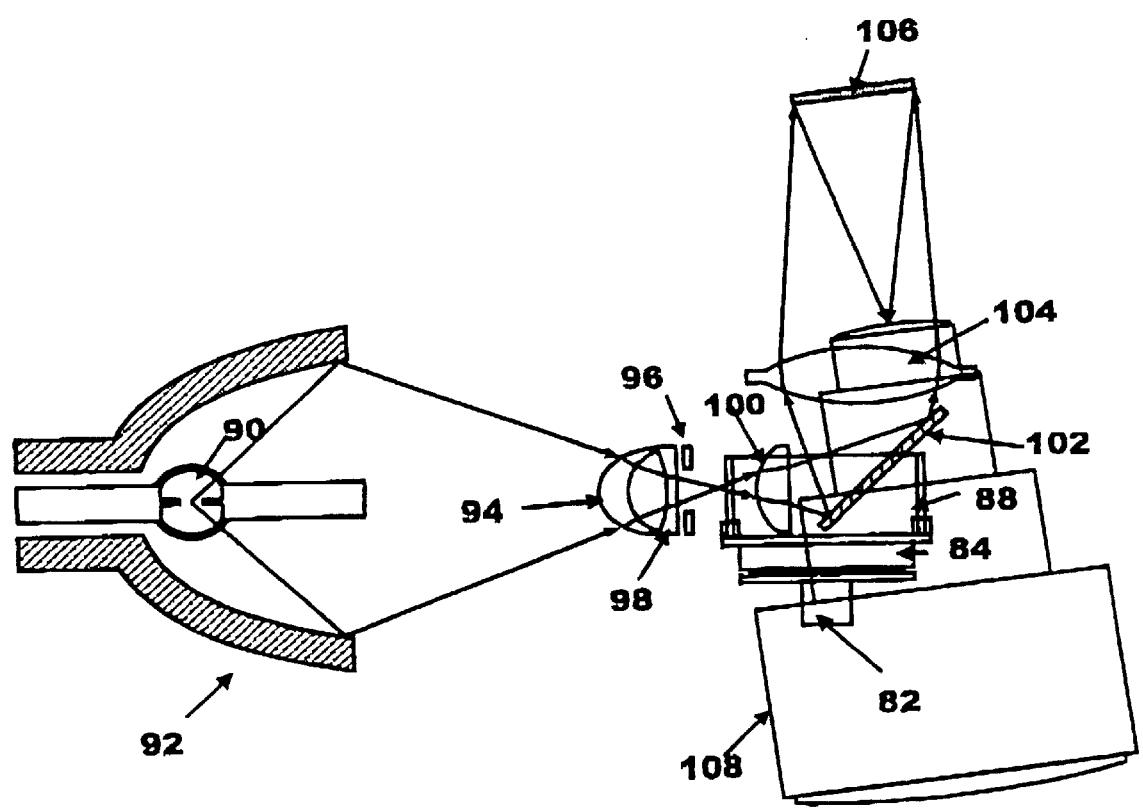
FIG. 9 is a schematic view showing a configuration of a picture projector according to an embodiment of the present invention in which the cylindrical color wheel of FIG. 8A is installed at the interior thereof.

FIG. 9 shows a picture projector according to a first embodiment of the present invention in which the cylindrical color wheel is installed at the interior thereof. Referring to FIG. 9, the present picture projector includes a lamp 90 for generating a light beam, a reflector 92 for reflecting a light beam into the front direction of the lamp 90, a first illuminating lens 94 for narrowing a width of a light beam reflected from the reflector 92, a second illuminating lens 98 for making a uniform distribution of a light beam converged from the first illuminating lens 94, a field diaphragm 96 for shutting off a spurious light beam, a color wheel 80 for sequentially separating and transmitting three original color lights by its rotation, a third illuminating lens 100 for narrowing a width of a divergent light beam passing through the color wheel 80, a full-reflective mirror 102 for reflecting a light beam passing through the third illuminating lens 100 in a specific direction, a fourth illuminating lens 104 for converging a light beam reflected from the full-reflective mirror 102 to apply it to a picture display device 106, a picture display device 106 for reflecting a light beam from the fourth illuminating lens 104 in accordance with an image signal to generate a picture beam carried with a picture information, and a projecting lens 108 for enlarging and projecting the picture beam realized at the picture display device 106 at a certain distance. A light beam generated from the lamp 90 is focused into a first focus length (i.e., a focus length of the reflector) by means of the reflector 92. The first illuminating lens 94 narrows a width of the light beam focused into the first focus length to apply it to the second illuminating lens 98. The second illuminating lens 98 uniforms a light distribution of the light beam from the first illuminating lens 94 to apply it to the color wheel 80. The field diaphragm 96 provided between the second illuminating lens 98 and the color wheel 80 shuts off a spurious light in the light beam applied from the second illuminating lens 98 to the color wheel 80. The color wheel 80 is rotated by a driving force of the motor 82 to sequentially transmit red (R), green (G) and blue (B) color lights. More specifically, the color filter 88 is rotated at a desired speed by a driving force of the motor 82. The color filter 88 consists of red, green and blue color filters 88R, 88G and 88B so that it may transmit red, green and blue lights. In other words, the color wheel 80 rotates at a desired speed to separate the light beam inputted from the second illuminating lens 98 into a red, green or blue light. The color filter 88 may include a portion for transmitting a light as it is besides the red, green and blue color filters 88R, 88G and 88B so as to improve a picture brightness. A light beam passing through the second illuminating lens 98 diverges beyond a focus length of the first illuminating lens 94. The third illuminating lens 100 narrows a width of the light beam so that all the light beam diverging beyond a focus length of the first illuminating lens 94 can be incident to the full-reflective mirror 102. The full-reflective mirror 102 reflects a light beam incident to itself to apply it the fourth illuminating lens 104. The fourth illuminating lens 104 focuses a light beam from the full reflective mirror 102 into the picture display device 106. The picture display device 106 reflects a light beam inputted from the fourth illuminating lens 104 in accordance with an image signal to generate a picture beam carried with a picture information and transfers the picture beam to the projecting lens 108. The projecting lens 108 enlarges the picture beam to transmit the enlarged picture beam onto a screen installed ahead certain distance.

Figure 10A:
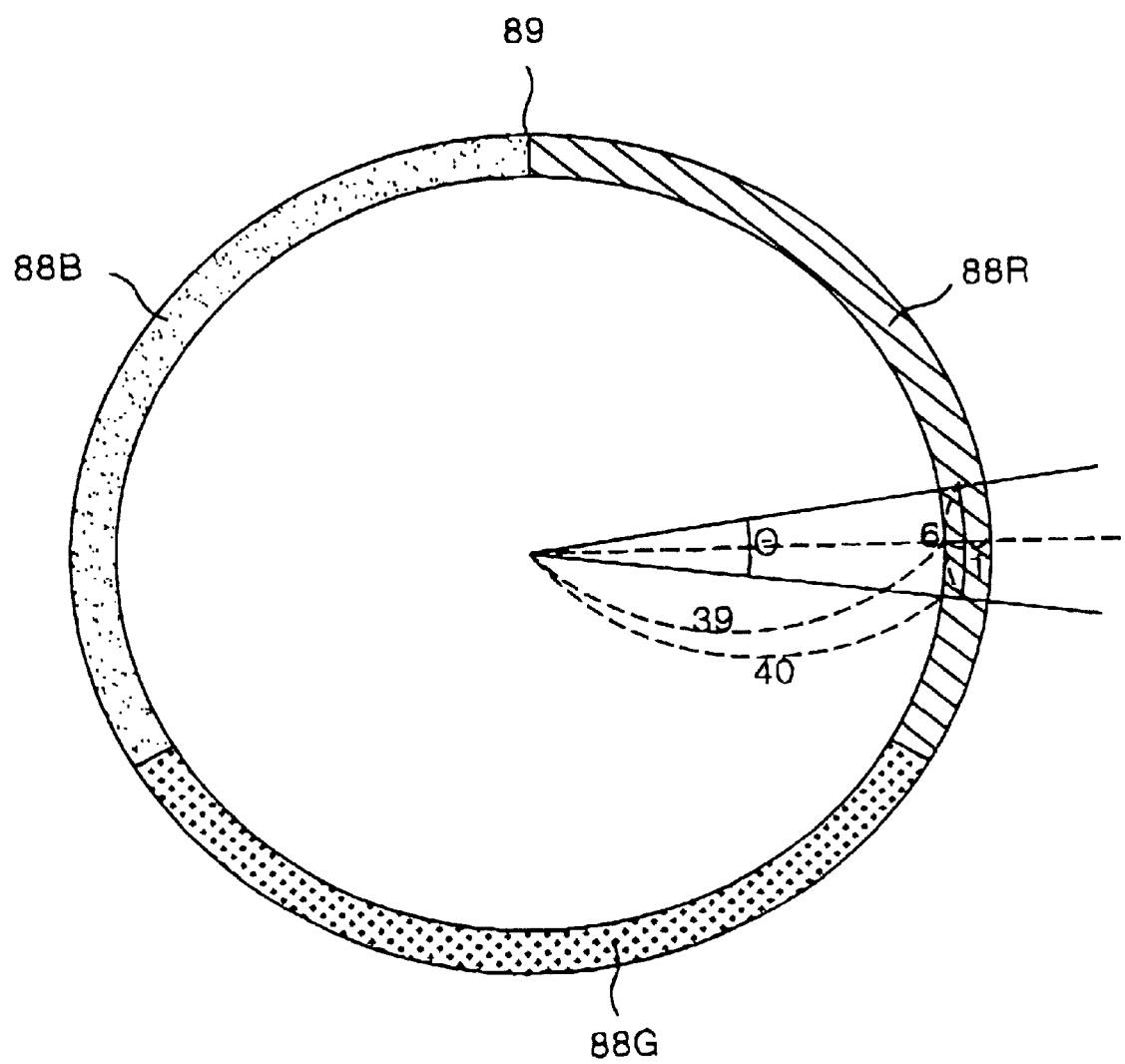
FIG. 10A and FIG. 10B show a time when a light beam passes through boundary portions of the cylindrical color wheel in FIG. 8A.
Figure 10B:
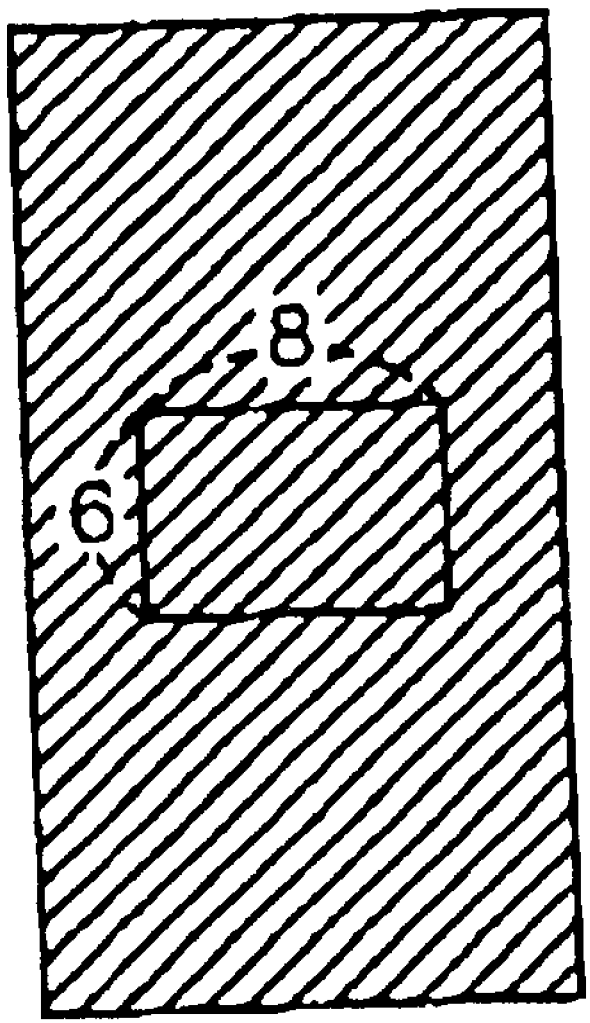

In the picture projector, when a light beam passing through the second illuminating lens 98 passes through the color wheel 88, the light beam should pass through a boundary portions 89 of the color filter 88 as shown in FIG. 10A at a minimum time. For instance, assuming that the motor is rotated at a speed of 3600 RPM so as to display a field of 60 times per second, a time when a light beam passes through the boundaries 89 will be calculated. In this case, it is assumed that, as shown in FIG. 10A and FIG. 10B, a light beam is a square having a size of 8 mm in width and 6 mm in length; and an inner radius of the color wheel 80 is 39 mm and a thickness thereof is 1 mm. An angle when the light beam passes through a certain surface of the color filter 88 is given by the following equation.
(3)
wherein 39 is an inner radius, and 3 is a half value of the length of the light beam. A time when the light beam passes the boundary portions 89 of the color filter 88 is given by the following equation.

$$t = \frac{1}{60} \times \frac{8.797}{120} = 1.22 \mu s$$

wherein 120 is a value of dividing 360° by 3 (i.e., the number of boundary portions 89). As seen from the equation (4), a time of 1.22 µs is required when the light beam passes through the boundary portions 89 of the color filter 88. Compared with the conventional color wheel 10, a time of 1.54 µs was required when the light beam passed through the boundary portions 7 of the color filter 6. Accordingly, a time when a light beam passes through the color filter 88 can be lengthened to increase a brightness of the picture projector. Also, if the present color wheel 80 maintains the same brightness as the conventional color wheel 10, then a radius of the present color wheel 80 can be reduced into 32 mm. Furthermore, the picture projector provided with the present color wheel 80 can be made into smaller dimension than the prior art. In addition, in the present picture projector, the third illuminating lens 100 and the full-reflective mirror 102 is installed at the interior of the color wheel 80. In other words, the color wheel 80 is installed to overlap with an optical system, so that a size of the picture projector can be dramatically reduced.

The first illuminating lens 94 installed at the interior of the picture projector according to the first embodiment of the present invention is a meniscus-type convex lens having a shape of being convex toward the lamp 90 so as to narrow a width of a light focused by means of the reflector 92. The second illuminating lens 98 provided between the first illuminating lens 94 and the field diaphragm 96 is a concave lens having a shape of being concave toward the lamp 98. An operation process of the first and second illuminating lenses 94 and 98 will be described in detail in comparison to the conventional illuminating lens 16.

Figure 11A:
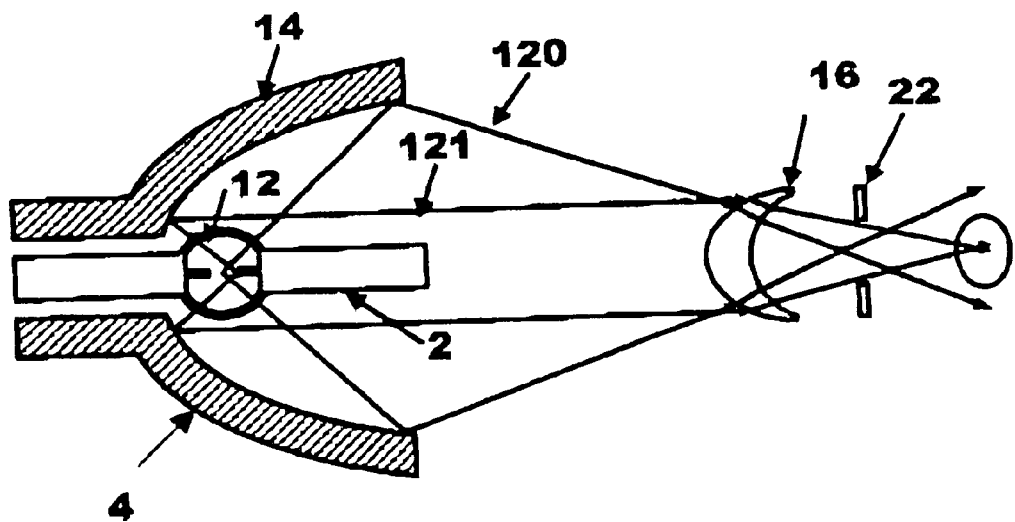
FIG. 11A and FIG. 11B are views for comparing an operation principle of the conventional illuminating lens with that of the present illuminating lens.
Figure 11B:
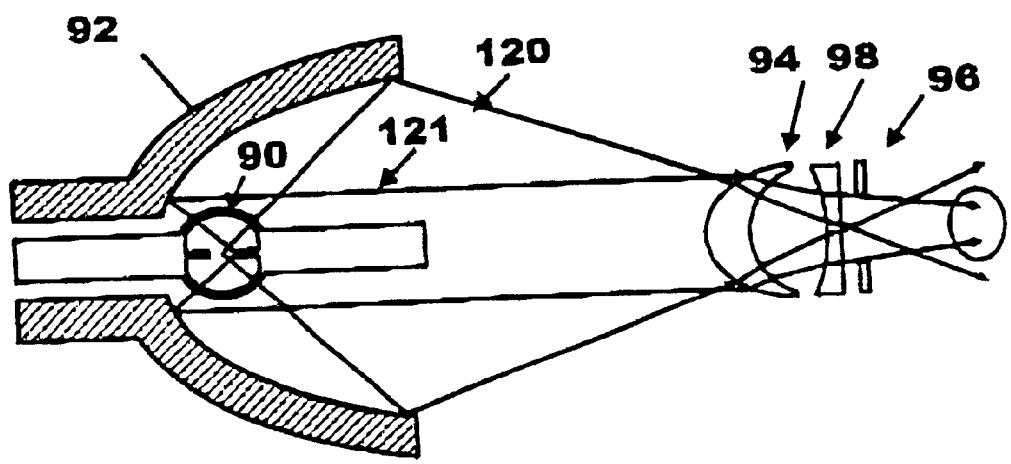

FIG. 11A shows the conventional illuminating lens 16 while FIG. 11B shows the present illuminating lenses 94 and 98. Referring to FIG. 11A, a portion of light beam generated from the lamp 12 is reflected by means of the reflector 14 to be incident to the first illuminating lens 16, and the remaining portion thereof is directly incident to the first illuminating lens 16. The light beam incident to the first illuminating lens 16 is divided into a parallel light 121 inputted directly from the lamp 12 and a convergent light 120 is reflected by means of the reflector 14 to be converged into the first illuminating lens 16. The light beam incident to the first illuminating lens 16 in this manner is imaged into a different focus length at the center and the edge thereof. As a result, a light beam converged by means of the first illuminating lens 16 and having a beam flux controlled by means of the field diaphragm 22 has a non-uniform light amount distribution at the center and the edge of the illuminating lens 16.

On the other hand, in a illuminating system as shown in FIG. 11B, the second illuminating lens 98 are provided between the first illuminating lens 94 and the field diaphragm 96. The second illuminating lens 98 plays a role to compensate for a non-uniform distribution of the converging light beam from the first illuminating lens 94. As a result, a light beam outputted from the illuminating system as shown in FIG. 11B has more uniform light distribution characteristic than that form the illuminating system as shown in FIG. 11A.

Figure 12:
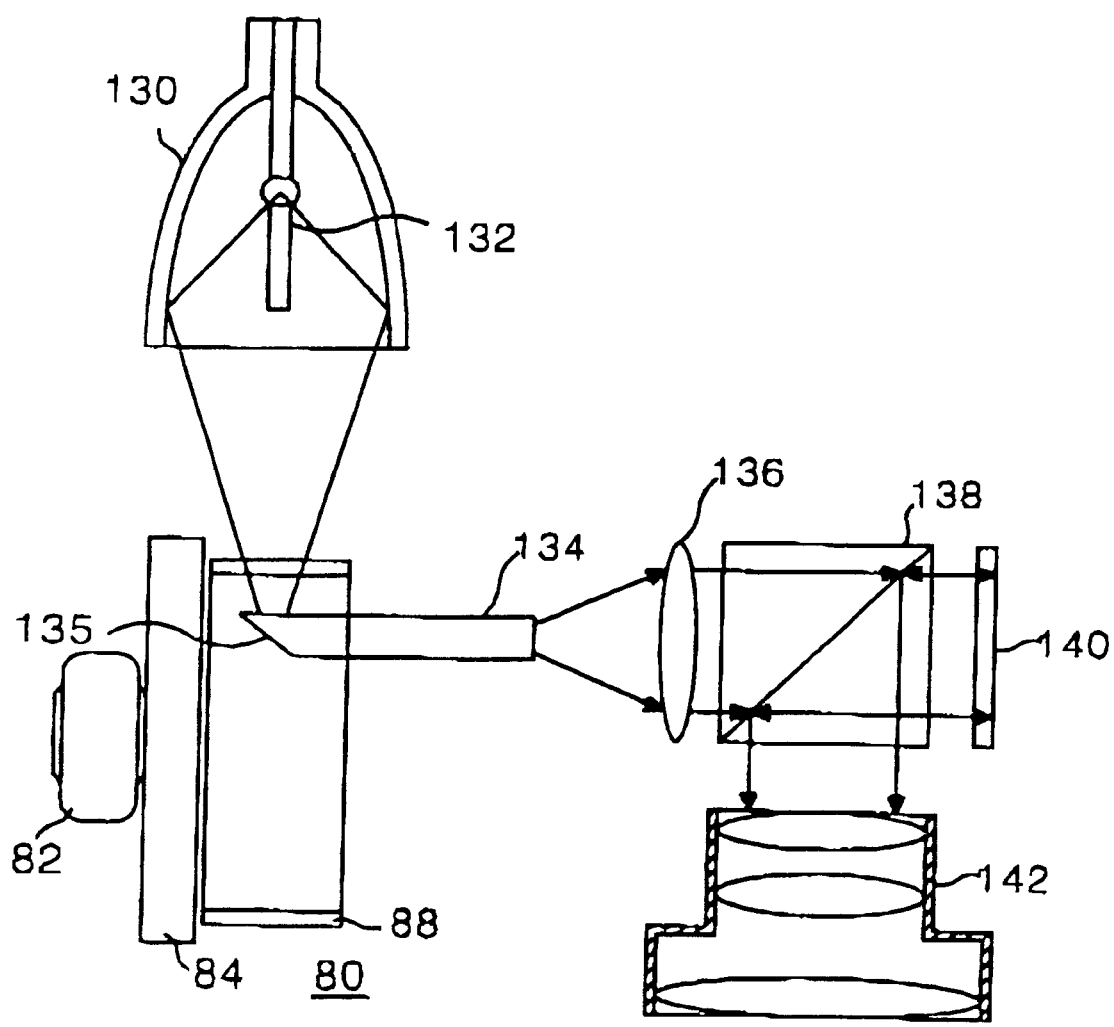
FIG. 12 is a schematic view showing a configuration of a picture projector according to another embodiment of the present invention in which the cylindrical color wheel of FIG. 8A is installed at the interior thereof.

Referring to FIG. 12, there is shown a picture projector according to a second embodiment of the present invention in which a cylindrical color wheel is installed at the interior thereof. The present picture projector includes a lamp 132 for generating a light beam, a reflector 130 for reflecting a light beam into the front direction of the lamp 132, a color wheel 80 for transmitting only a specific color light of a light beam, a road lens 134 for making a uniform light distribution of the color-separated light beam, a collimator lens 136 for progressing a light beam passing through the road lens 134 in parallel, a beam splitter 138 for transmitting a light beam inputted from the collimator lens 136 and reflecting a light beam inputted from a picture display device 140, a picture display device 140 for reflecting a light beam from the collimator lens 136 in accordance with an image signal to display a picture, and a projecting lens 142 for enlarging and projecting a picture beam inputted from the picture display device 140 at a certain distance. A light beam generated from the lamp 132 is focused to the color filter 88 of the color wheel 80 by means of the reflector 130. The color filter 88 is rotated by a driving force of a motor 82 to sequentially transmit red (R), green (G) and blue (B) color lights. The light beam color-separated by the color wheel 80 is incident to the road lens 134. The road lens 134 uniforms a light beam so that the light beam may be uniformly distributed on a screen, and changes a progressing path of the light beam. To this end, one side surface (i.e., inclined surface) 135 of the road lens 134 to which a light beam passing through the color filter 88 is incident has a desired angle of incline. The inclined surface 135 is coated with a full-reflective material so that a light beam passing through the color filter 88 may be full-reflected. A light beam passing through the road lens 134 is progressed to the picture display device 140 in parallel by means of the collimator lens 136. At this time, the light beam progressing, in parallel, from the collimator lens 136 into the picture display device 50 transmits the beam splitter 138. The picture display device 140 reflects a light beam inputted from the collimator lens 136 in accordance with an image signal to generate a picture beam carried with a picture information and transfers the picture beam to the beam splitter 138. The beam splitter 138 reflects the picture beam from the picture display device 140 into the projecting lens 142. The projecting lens 142 enlarges the picture beam to transmit the enlarged picture beam onto a screen provided ahead certain distance.

In the picture projector according to the second embodiment of the present invention, the color wheel 88 is formed to overlap with the road lens 134 at a desired portion thereof. Thus, a size of the present picture projector can be dramatically reduced in comparison to that of the conventional picture projector.

Figure 13:
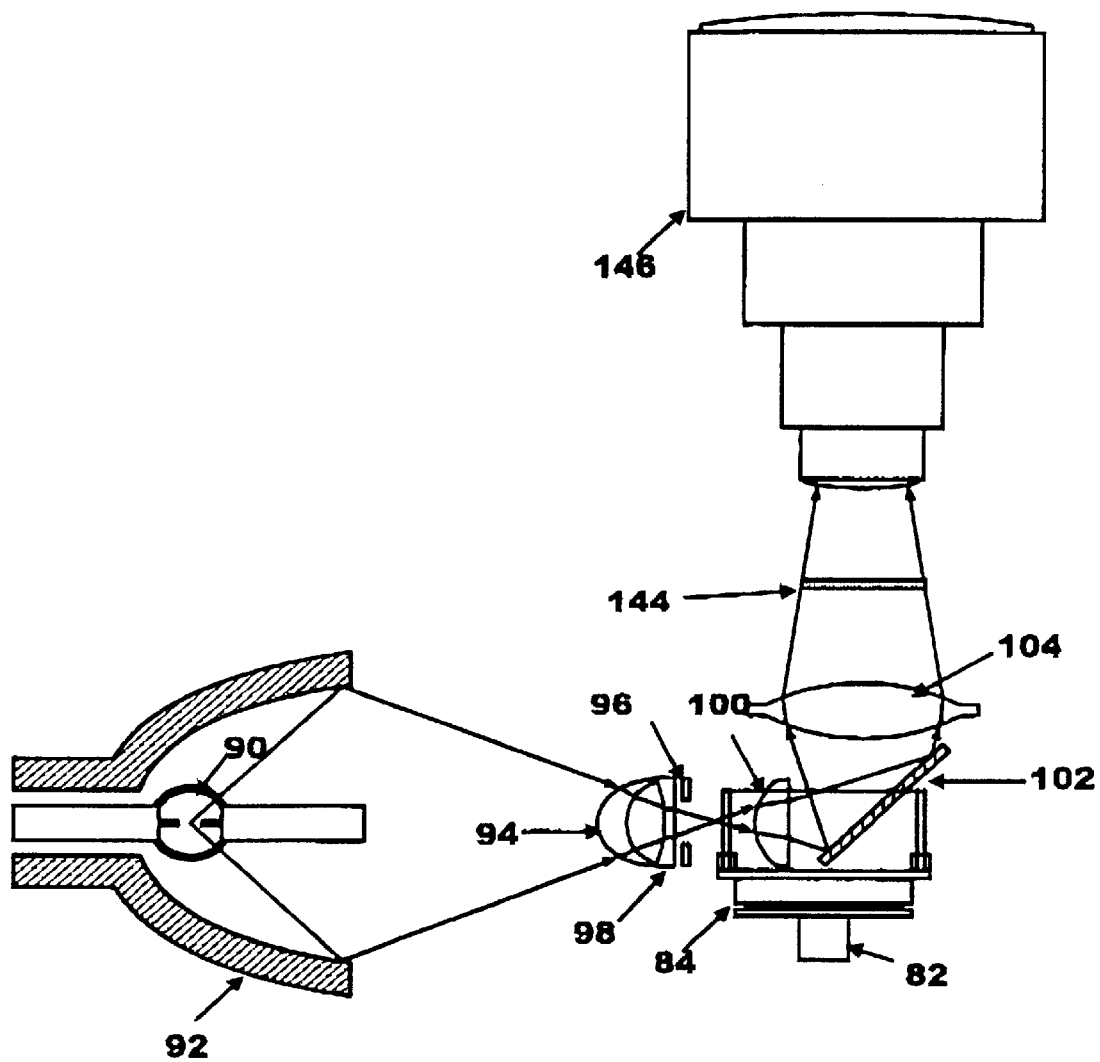
FIG. 13 is a schematic view showing a configuration of a picture projector according to still another embodiment of the present invention in which the cylindrical color wheel of FIG. 8A is installed at the interior thereof.

FIG. 13 shows a picture projector according to a third embodiment of the present invention in which a cylindrical color wheel is installed at the interior thereof. In FIG. 13, elements having the same function and structure as those of the picture projector shown in FIG. 9 is given by identical numerals, and a detailed explanation as to these elements will be omitted.

Referring now to FIG. 13, the picture projector according to the third embodiment includes a transmissive picture display device 144 provided between a fourth illuminating lens 104 and a projecting lens 146. The picture display device 144 transmits a light beam inputted from the fourth illuminating lens 104 in accordance with an image signal to generate a picture beam carried with a picture information. The picture beam generated from the picture display device 144 is transferred to the projecting lens 146. Then, the projecting lens 146 enlarges the picture beam to transmit it onto a screen installed ahead certain distance.

FIGS. 14A to 14E show a method of fabricating a cylindrical color wheel according to an embodiment of the present invention. Referring to FIGS. 14A to 14E, first, a cylinder-shaped tube 150 is made from a transparent material (e.g., glass). After the cylinder-shaped tube 150 was made, the surface of the cylinder-shaped tube 150 is coated with red, green and blue dyes. More specifically, first, the surface of the cylinder-shaped tube 150 other than a portion to be coated with a red dye is covered with a mask. Then, a red dye is coated on the surface of the cylinder-shaped tube 150. After coating of the red dye, the surface of the cylinder-shaped tube 150 other than a portion to be coated with a green dye is covered with a mask. Then, a green dye is coated on the surface of the cylinder-shaped tube 150. After coating of the green dye, the surface of the cylinder-shaped tube 150 other than a portion to be coated with a blue dye is covered with a mask. Then, a blue dye is coated on the surface of the cylinder-shaped tube 150. In this case, a portion coated with a red dye becomes a red color filter 88R; a portion coated with a green dye becomes a green color filter 88G; and a portion coated with a blue dye becomes a blue color filter 88B. After the surface of the cylinder-shaped tube 150 was coated with the red, green and blue dyes, the cylinder-shaped tube 150 is cut away into a desired size. Thereafter, the cut-away cylinder-shaped tube (i.e., color filter) is attached to the coupler 84. To this end, the coupler 84 is provided with holes to which the color filter 88 can be inserted. In other words, the color filter 88 is inserted into the holes formed in the coupler 84 and attached to the coupler by an adhesive. Thus, the color filter 88 is attached, with a strong adhesive force, to the coupler 84. Thereafter, the coupler 84 is attached to the motor 82 to complete the cylindrical color wheel 80.

Since the color filter fabricated in this manner is formed on the surface of the cylinder-shaped tube, it is subject to the same centrifugal force upon rotation of the motor 84. Accordingly, a trembling or a noise generated upon rotation of the motor 84 can be minimized. Also, since the cylinder-shaped tube 150 is cut away after the red, green and blue dyes was coated on the surface of the cylinder-shaped tube 150 to thereby complete the color filter 88, the present color filter fabrication method is available for a mass production. Alternatively, in the fabricating method of the present cylindrical color wheel, the red, green and blue dyes may be coated on the cut-away cylinder-shaped tube 150 after the cylinder-shaped tube was cut away into a desired size.

Figure 14A:
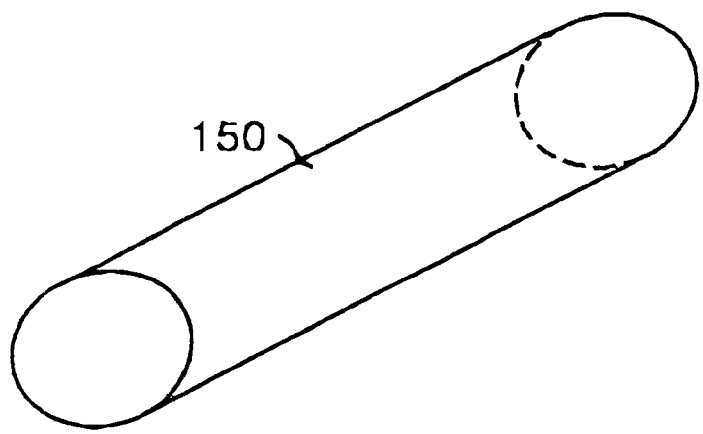
FIG. 14A to FIG. 14E show a method example of fabricating the cylindrical color wheel of FIG. 8A.
Figure 14B:
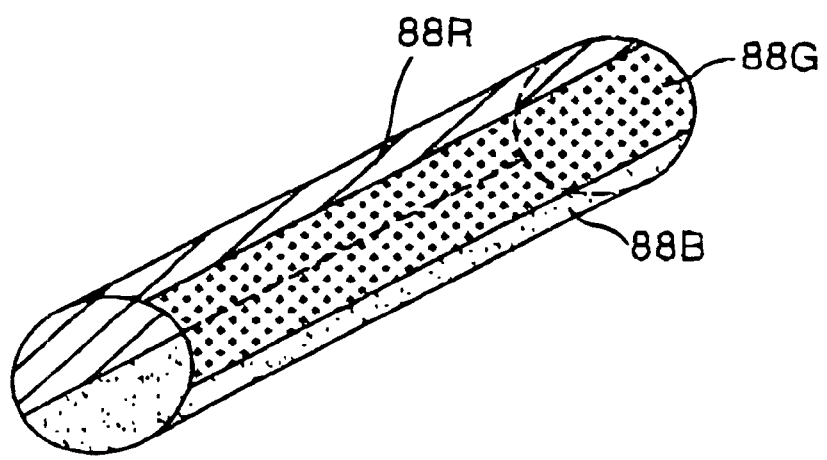
Figure 14C:
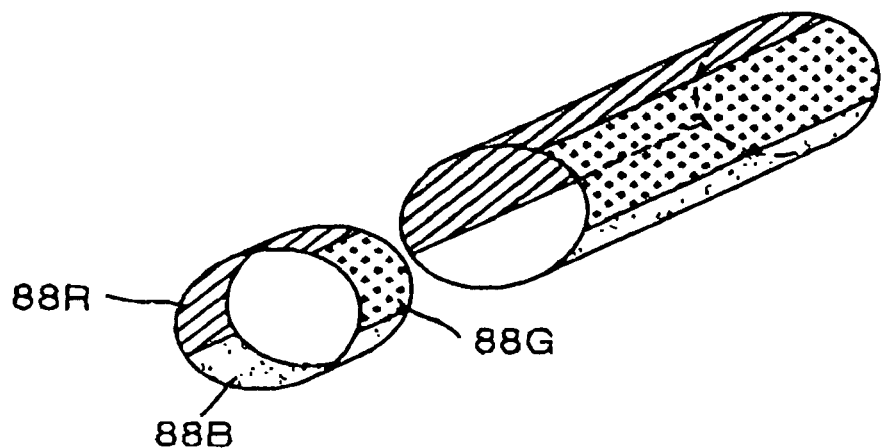
Figure 14D:
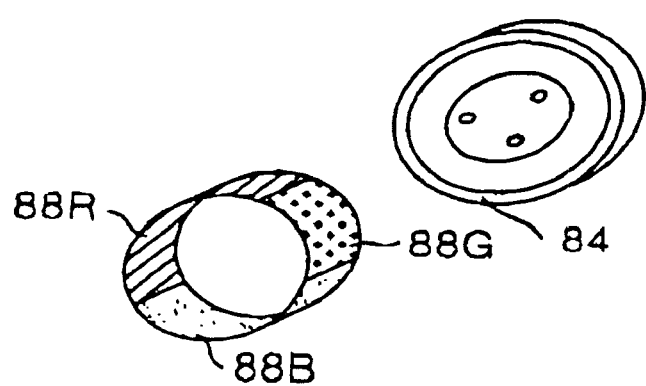
Figure 14E:
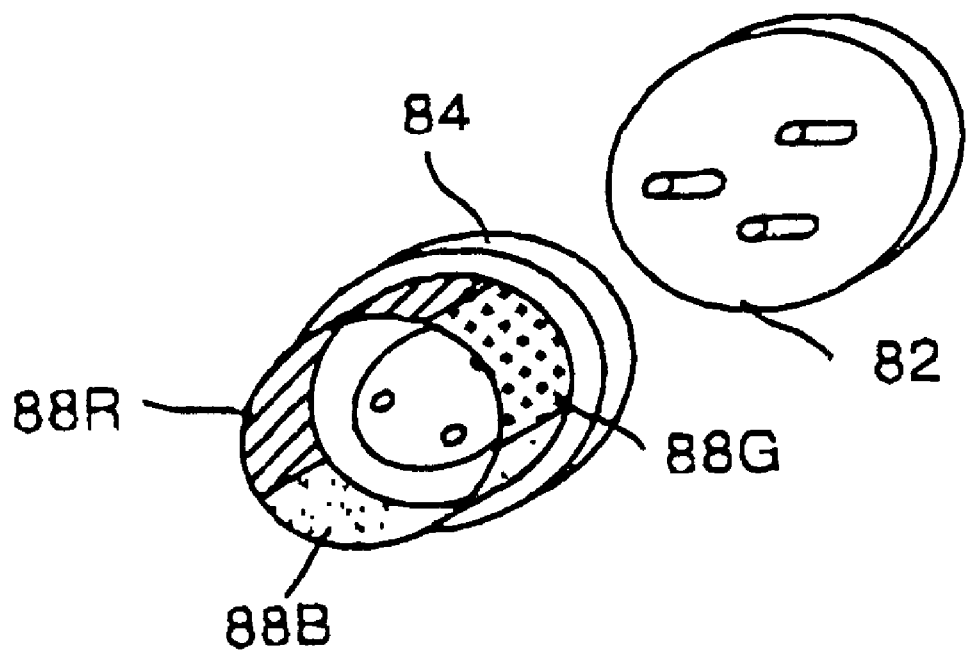
Figure 15A:
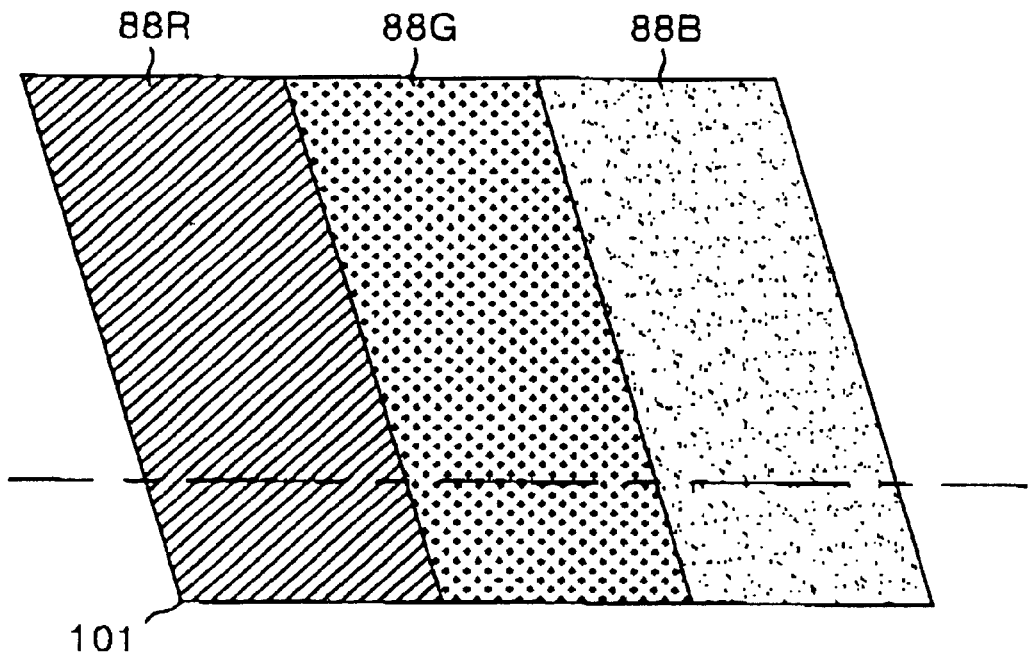
FIG. 15A and FIG. 15B show another method example of fabricating the cylindrical color wheel of FIG. 8A.
Figure 15B:
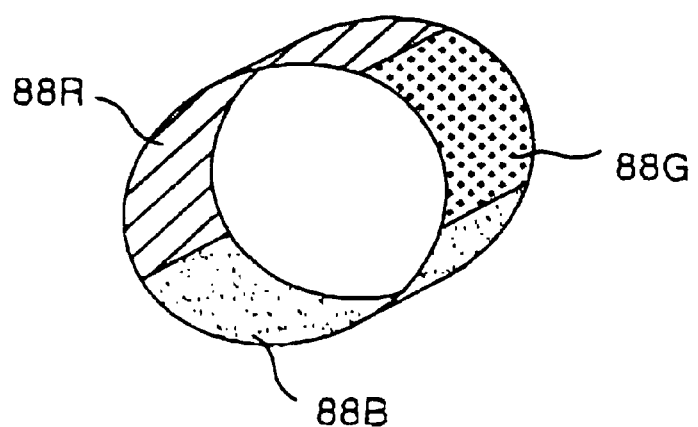

FIGS. 15A and 14B show a method of fabricating a cylindrical color wheel according to another embodiment of the present invention. Referring to FIGS. 15A and 15B, first, red, green and blue dyes are coated on the surface of a thin film 101 having a desired strength. After the surface of the thin film 101 was coated with the red, green and blue dyes, the thin film 101 is cut away into a desired size. Then, the cut-away thin film 101 is wound. The wound thin film 101 is inserted into holes formed in the coupler 84 and attached to the coupler 84 by an adhesive. Thereafter, the coupler 84 is attached to the motor 82 to complete the cylindrical color wheel 84.

As described above, according to the present invention, the cylindrical color wheel occupying a relatively smaller space than the conventional color wheel is installed at the interior of the picture projector. Also, an optical system of the picture projector is installed at the interior of the cylindrical color wheel. Accordingly, a size of the picture projector can be minimized.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A cylindrical color wheel, comprising:
    a hollow color drum comprising a plurality of color filters for transmitting a portion of a light beam having different wavelength bands corresponding to different colors formed in a cylinder shape;
    a coupler to which the color drum is attached; and
    a motor for rotating the coupler to which the color drum is attached.

2. The cylindrical color wheel of claim 1, wherein the plurality of the color filters comprise:
    a red color filter for transmitting only a wavelength corresponding to a red color in a white light beam;
    a green color filter for transmitting only a wavelength corresponding to a green color in a white light beam; and a blue color filter for transmitting only a wavelength corresponding to a blue color in a white light beam.

3. The cylindrical color wheel of claim 1, wherein the plurality of the color filters comprise:
   a red color filter for transmitting only a wavelength corresponding to a red color in a white light beam;
   a green color filter for transmitting only a wavelength corresponding to a green color in a white light beam;
   a blue color filter for transmitting only a wavelength corresponding to a blue color in a white light beam; and
   a colorless filter for transmitting only a white light beam.

4. The cylindrical color wheel of claim 1, wherein the coupler is provided with holes for inserting the color drum.

5. A picture projector, comprising:
   a light source for generating a light beam;
   a first optical device for focusing a light beam inputted from the light source;
   a second optical device for making a uniform light distribution of the light beam focused at the first optical device;
   a cylindrical color wheel, wherein said cylindrical color wheel is formed in a hollow cylinder shape and comprises a plurality of color filters configured to sequentially separate and transmit a colored light from the light beam inputted from the second optical device;
   a picture display device configured to work in cooperation with the color wheel to display a picture according to an image signal; and
   a projecting lens for enlarging and projecting the picture.

6. The picture projector as claimed in claim 5, wherein the cylindrical color wheel comprises:
   a color drum in which red, green and blue color filters is integrally formed in a cylinder shape;
   a coupler to which the color drum is attached; and
   a motor for rotating the coupler to which the color drum is attached.

7. The picture projector of claim 5, wherein the picture display device comprises a reflective liquid crystal display panel.

8. The picture projector of claim 5, wherein the picture display device comprises a transmissive liquid crystal display panel.

9. A picture projector, comprising:
   a light source for generating a light beam;
   a reflector for reflecting the light beam into a front direction of the light source;
   cylindrical color wheel with a hollow interior configured for sequentially separating and transmitting a colored light from the light beam reflected from the reflector;
   a road lens for making a uniform light distribution of the colored light;
   a collimator lens for collimating the light beam inputted from the road lens;
   a picture display device configured to work in cooperation with the color light inputted from the collimator lens to generate a picture beam according to an image signal;
   a beam splitter disposed between the collimator lens and the picture display device configured for transmitting the colored light inputted from the collimator lens and reflecting the picture beam inputted from the picture display device; and
   a projecting lens configured for enlarging and projecting the picture beam.

10. The picture projector of claim 9, wherein a portion of the road lens is located within the hollow interior of the cylindrical color wheel.

11. The picture projector of claim 10, wherein an input side of the road lens is within the hollow interior of the cylindrical color wheel.

12. A method of fabricating a cylindrical color wheel, comprising:
    coating red, green and blue dyes on the surface of a transparent cylinder-shaped tube;
    cutting the transparent cylinder-shaped tube coated with the dyes into a hollow cylinder;
    attaching the hollow cylinder to a coupler; and
    attaching the coupler to a motor.

13. The method of claim 12, further comprising:
    providing the coupler with holes for inserting the hollow cylinder.

14. The method of claim 12, wherein the hollow cylinder is inserted into the holes in the coupler and attached to the coupler by an adhesive.

15. The method of claim 12, wherein the hollow cylinder comprises glass.

16. A method of fabricating a cylindrical color wheel, comprising:
    coating red, green and blue dyes on a transparent thin film;
    cutting the thin film coated with the dyes into a strip of prescribed dimensions;
    winding the strip in a drum shape;
    attaching the drum-shaped strip to a coupler; and
    attaching the coupler to a motor.

17. A picture projector, comprising:
    a light source for generating a light beam;
    a first optical device, comprising at least one meniscus-type convex lens, for focusing a light beam inputted from the light source;
    a second optical device, comprising at least one meniscus-type concave lens, for making a uniform light distribution of the light beam focused at the first optical device;
    a cylindrical color wheel, wherein said cylindrical color wheel is formed in a hollow cylinder shape and comprises a plurality of color filters configured to sequentially separate and transmit a colored light from the light beam inputted from the second optical device;
    a picture display device configured to work in cooperation with the color wheel to display a picture according to an image signal; and
    a projecting lens for enlarging and projecting the picture.

18. A picture projector, comprising:
    a light source for generating a light beam;
    a first optical device for focusing a light beam inputted from the light source;
    a second optical device for making a uniform light distribution of the light beam focused at the first optical device;
    a cylindrical color wheel, wherein said cylindrical color wheel is formed in a hollow cylinder shape and comprises a plurality of color filters configured to sequentially separate and transmit a colored light from the light beam inputted from the second optical device;
    a picture display device configured to work in cooperation with the color wheel to display a picture according to an image signal;

a third optical device, to which a color light transmitted by the cylindrical color wheel is incident, for preventing an output angle of the incident color light from being increased;

a full-reflective mirror for changing an incident progressing direction of a color light illuminated by the third optical device;

a fourth optical device for focusing the color light into the picture display device; and a projecting lens for enlarging and projecting the picture.

19. The picture projector of claim 18, wherein the third optical device and the full-reflective mirror is located inside the cylindrical color wheel.

20. A picture projector, comprising:

a light source for generating a light beam;

a reflector for reflecting the light beam into a front direction of the light source;

a cylindrical color wheel with a hollow interior configured for sequentially separating and transmitting a colored light from the light beam reflected from the reflector;

a road lens for making a uniform light distribution of the colored light, wherein an incidence side of the road lens is inclined to change a progressing path of the light beam;

a collimator lens for collimating the light beam inputted from the road lens;

a picture display device configured to work in cooperation with the color light inputted from the collimator lens to generate a picture beam according to an image signal;

a beam splitter disposed between the collimator lens and the picture display device configured for transmitting the colored light inputted from the collimator lens and reflecting the picture beam inputted from the picture display device; and a projecting lens configured for enlarging and projecting the picture beam.

21. The picture projector of claim 20, wherein the incidence side of the road lens is coated with a full-reflective material to reflect the light beam.

22. The picture projector of claim 20, wherein the incidence side of the road lens is provided with a full-reflective mirror.

23. A color wheel, comprising:

a drum comprising a circumferential wall, wherein the circumferential wall comprises at least two color filters and defines a hollow interior within the drum, wherein each color filter transmits a beam of light of a predetermined color towards the hollow interior of the drum.

24. The color wheel of claim 23, wherein the circumferential wall further comprises a colorless filter.

25. The color wheel of claim 23, wherein the drum is configured to have at least one optical component positioned therein.

26. The color wheel of claim 25, wherein the at least one optical component is configured to receive the beam of light of a predetermined color transmitted towards the hollow interior of the drum and reflect the beam of light out of the hollow interior of the drum.

27. A picture projector comprising the color wheel of claim 23.

28. A color wheel, comprising:

a drum comprising a circumferential wall, wherein the circumferential wall comprises at least two color filters and defines a hollow interior within the drum;

an optical component positioned to receive a beam of light transmitted through the circumferential wall towards the hollow interior of the drum, wherein the optical component couples the transmitted light out of the hollow interior of the drum along an optical path that does not intersect any of the color filters.

29. The color wheel of claim 28, wherein the circumferential wall further comprises a colorless filter.

30. A color wheel, comprising:

a drum comprising a circumferential wall, wherein the circumferential wall comprises at least two color filters and defines a hollow interior within the drum;

an optical component positioned to receive a beam of light transmitted through the circumferential wall towards the hollow interior of the drum, wherein the optical component is configured to remain stationary while the drum moves.

31. The color wheel of claim 30, wherein the circumferential wall further comprises a colorless filter.

32. A method of making a color wheel, comprising:

forming at least two color filters on a cylindrical glass tube; and cutting the cylindrical glass tube into a section of a prescribed length.

33. The method of claim 32, wherein the at least two color filters are formed on the cylindrical glass tube by coating a surface of the cylindrical glass tube with dye.

34. The method of claim 32, further comprising configuring the section to be rotated by a motor.

35. A method of making a color wheel, comprising:

forming at least two color filters on a planar member;

forming a substantially cylindrical hollow body from the planar member.

36. The method of claim 35, wherein the at least two color filters are formed on the planar member by applying a dye to a thin film.

37. The method of claim 36, wherein the substantially cylindrical hollow body is formed by winding the thin film into a substantially cylindrical shape.

38. The method of claim 35, further comprising configuring the cylindrical hollow body to be rotated by a motor.

* * * * *